March 7, 1939. N. B. HENRY 2,149,675
VARIABLE SPEED TRANSMISSION
Filed Nov. 11, 1937  2 Sheets-Sheet 1
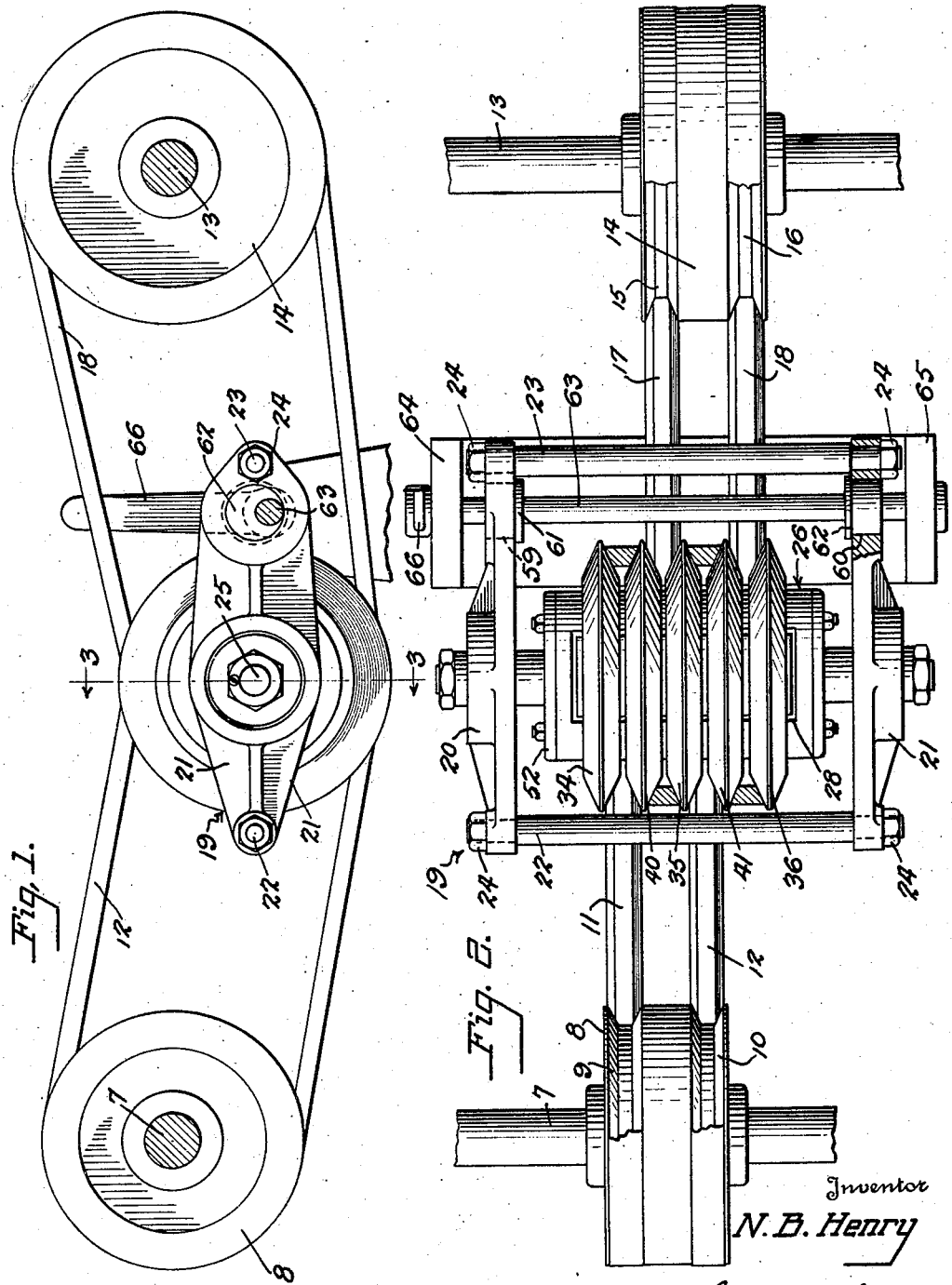
Inventor
N. B. Henry
By Mason Fenwick & Lawrence
Attorneys March 7, 1939.  N. B. HENRY  2,149,675
VARIABLE SPEED TRANSMISSION
Filed Nov. 11, 1937  2 Sheets-Sheet 2
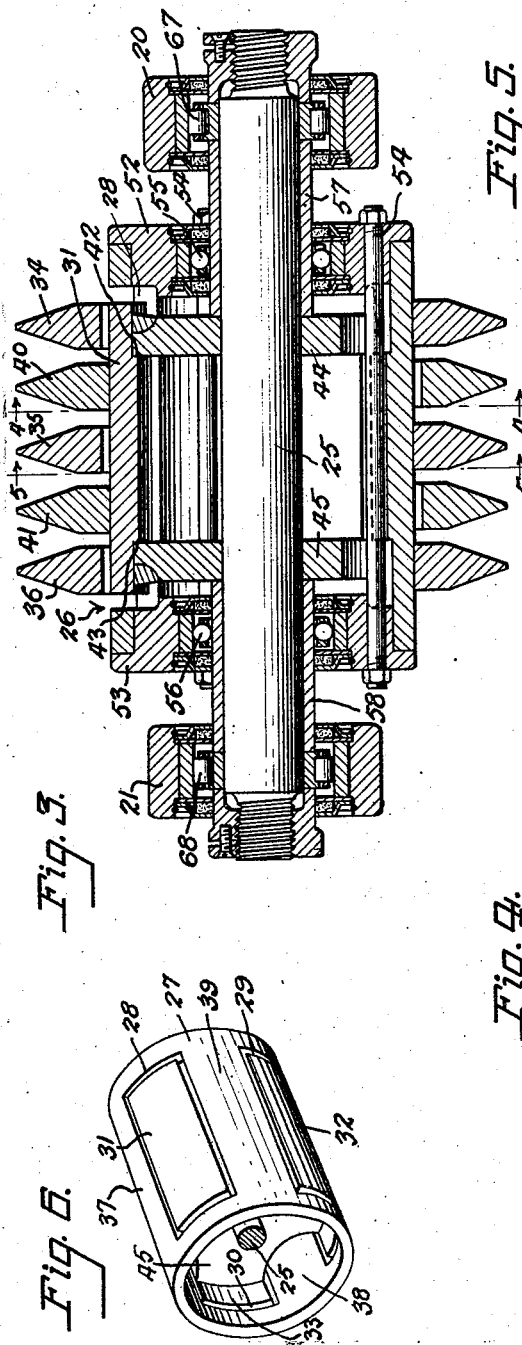
Inventor
N. B. Henry Patented Mar. 7, 1939

2,149,675

UNITED STATES PATENT OFFICE 2,149,675

VARIABLE SPEED TRANSMISSION

Nelson B. Henry, Columbus, Ga.

Application November 11, 1937, Serial No. 174,118

8 Claims. (Cl. 74—230.17)

This invention relates generally to differential transmission gearing; and more particularly to gearing adapted for use on textile machinery, machine tools and other mechanical devices for changing the speed of rotation of a driving shaft as transmitted to a driven shaft.

The main object of the invention is to provide a change speed transmission system involving the use of standard V-belts and constructed so as to permit the use of any desired number of such belts for the purpose of transmitting greater power than has heretofore been possible by belt driven transmission devices of the prior art.

Another object of the invention is to provide a change speed transmission system involving the use of V-belts transmitting power from a driving shaft through compensating variable pitch sheave to a driven shaft and in which the compensating sheave automatically operates to maintain a balanced drive, with the shaft of the compensating or variable pitch sheave constantly parallel to the driving and driven shafts.

Other objects of the invention will become apparent as the detailed description thereof proceeds.

In the drawings:

Figure 1 is a side elevation of a preferred embodiment of this invention;

Figure 2 is a top plan of the system shown in Figure 1, parts being broken away and other parts shown in section to illustrate details of construction;

Figure 3 is a vertical transverse section taken on the line 3—3 of Figure 1;

Figure 4 is a section taken on the line 4—4 of Figure 3;

Figure 5 is a section taken on the line 5—5 of Figure 3; and

Figure 6 is a perspective of a tubular member on which the V-shaped flanges of the differential sheave are secured, and illustrating the method of securing said flanges to the several parts of said tube.

As shown in the drawings, the shaft 7 is a driving shaft journaled in suitable bearing (not shown) and having fixed thereto the sheave 8 provided with two trapezoidal grooves 9 and 10 to receive the endless V-belts 11 and 12 of the same cross section as the aforesaid grooves. The driven shaft 13, journaled in suitable bearings, (not shown) has fixed thereto the sheave 14 provided with parallel trapezoidal grooves 15 and 16 receiving respectively the endless V-belts 17 and 18 of the same trapezoidal cross section as the said grooves 15 and 16.

To vary the speed of rotation of the driven shaft 13, there is interposed between the driving and driven shafts a speed varying mechanism designated generally by the reference numeral 19 and adapted to be adjusted for infinite speed variations in the driving of the shaft 13 within the range of the mechanism. This speed changing mechanism comprises a substantially rectangular frame formed by housings 20 and 21 secured parallel to each other by means of rods 22 and 23 which are shouldered at their opposite ends to form stops for the housings 20 and 21. The reduced ends of the rods 22 and 23 are screw threaded and the opposite ends of the housings 20 and 21 are apertured to receive these reduced ends which project beyond the outer surfaces of said housings to receive nuts 24 for locking the housings securely to said rods.

The housings 20 and 21 are apertured centrally to form journal bearings for the shaft 25, upon which is mounted the adjustable elements of the speed changing sheave designated generally by the reference numeral 26. The sheave 26 comprises a tube 27 provided with rectangular slots 28, 29, and 30 in which are slidably mounted the cylindrical segments 31, 32 and 33 of the same tube. The slotted tube 27 has three circular flanges 34, 35 and 36 welded to its unslotted parts 37, 38 and 39. These flanges 34, 35 and 36 have their inner peripheries provided with recesses over the segments 31, 32 and 33 to permit free sliding movements of said segments through said flanges.

The cooperating circular flanges 40 and 41 are similarly welded to the segments 31, 32 and 33 and have their inner peripheries provided with recesses to clear the unslotted parts 37, 38 and 39 of the tube 27. In forming the speed changing sheave 26, the tube 27 has its opposite ends recessed to provide shoulders 42 and 43 forming stops for the spiders 44 and 45, respectively, which are welded in position against these shoulders in any suitable manner. The spiders 44 and 45 are apertured at the axis of the tube 27 so as to receive the shaft 25.

In assembling the parts of the variable pitch sheave, the tube 27 is first provided with the slots 46, 47, 48, 49, 50 and 51 equiangularly spaced around and extending parallel to the axis of the tube. Then, the flanges 34, 35, 36, 40 and 41 are assembled in proper relation on the lengthwise slotted tube, the flanges 40 and 41 being arranged between the flanges 34, 35 and 36, respectively, as shown in Figures 3, 4 and 5 of the drawings. The flanges are then welded to those parts of the tube with which they contact. The spiders 44 and 45 are next welded in place against the shoulders 42 and 43.

The entire assembly is then mounted on an arbor or mandrel, the flanges are machined to their exact size and shape in a lathe, and the circumferential slots which join the ends of the longitudinal slots are milled adjacent the outer end of the flanges 34 and 36 to separate the segments 31, 32 and 33 from the main body of the tube 27. This method of manufacture insures the correct alignment and spacing of the flanges.

Housings 52 and 53 close the ends of the tube 27 and are held in position by means of the through bolts 54. These housings are respectively provided with ball bearings 55 and 56 for the clamping sleeves 57 and 58 mounted on opposite ends of the shaft 25. These ball bearings minimize the friction of the axial movement of tube 27 and attached circular flanges relative to shaft 25. The opposite ends of the shaft 25 are reduced and externally screw threaded to receive lock nuts 59 and 60 formed integral with the ends of said sleeves 57 and 58, respectively. The sleeves 57 and 58 extend in opposite directions along the shaft a sufficient distance to contact with the spiders 44 and 45 for the purpose of clamping these spiders and the parts connected thereto against axial movement relative to the shaft 25.

The housings 20 and 21 are provided near their ends adjacent to the bolt 23 with apertures 59 and 60 in which are rotatably mounted the eccentrics 61 and 62 suitably secured to a shaft 63 journaled at its opposite ends in bearing standards 64 and 65. The entire variable pitch sheave swings as an idler about the shaft 63 between the driving and driven sheaves 8 and 14. The belt 11 engages and drives the flanges 34 and 40, and the belt 12 engages and drives the flanges 35 and 41. The belt 17 engages and is driven by the flanges 40 and 35, and the belt 18 engages and is driven by the flanges 41 and 36. All of these belts are maintained tensioned by the weight of the variable pitch sheave as it swings about the shaft 63.

The shaft 63 with the eccentrics 61 and 62 secured thereto may be rotated in the bearings 64 and 65 by means of a handle 66 extending radially from one end of the shaft 63 where it projects through the bearing 64. This rotation of handle 66 changes the relative center distances between the variable pitch sheave and the driving and driven sheave, and effects corresponding changes in speed of rotation of the driven shaft 14. Roller bearings 67 and 68 are mounted in the housings 20 and 21, respectively, to provide for the rotation of the shaft 25 as well as a limited axial movement of said shaft in its bearings. This axial movement of the shaft 25 in its bearings as well as the axial movement of the flanges relative to one another as the speed is varied is obviously necessary to preserve parallelism between the driving and driven V-belts.

While the variable pitch sheave has been illustrated herein as an idler which maintains a constant tension on the V-belts due to its weight, it must be understood that this is not essential to the invention, and that this sheave can be mounted directly in line with the driving and driven sheave and any of the conventional methods can be employed to take up slack in the belts due to wear or stretch. It will also be obvious that many of the structural details of the system can be varied without affecting the operation thereof. Accordingly, the invention is not to be considered as limited in any way except as indicated by the scope of the claims appended hereto.

What I claim is:

1. A multiple belt speed change sheave comprising a shaft, a cylindrical support, means for fixing said support to said shaft, a set of bevel edged rings equi-distantly spaced along said support and secured against axial movement thereon, a second cylindrical support, means for mounting said second support to slide axially on said shaft, a second set of bevel edged rings spaced apart at distances equal to the spacing between the first named rings along said second support and arranged in alternation with the first named rings, all of said rings and shaft having a common axis.

2. The combination of the multiple belt speed change sheave set forth in claim 1, with driving and driven sheaves rotatable about axes parallel to said common axis and each provided with circumferential V-grooves spaced apart at a distance equal to the spacing of the bevel edged rings on said support.

3. The combination of driving and driven sheaves rotatable about parallel axes, of a frame comprising a pair of housings spaced apart parallel to each other, means for supporting said housings to swing about one end thereof, a shaft journaled in said housings, a support slidably and rotatably mounted on said shaft, a second support mounted on said shaft and fixed against axial movement thereon, a bevel edged ring fixed to the second support, a pair of bevel edged rings similar to said ring and fixed to the first named support, one on each side of said ring, all of said rings and shaft having a common axis, each of said driving and driven sheaves having a circumferential V-groove, V-belts extending around said V-grooves and around the V-grooves formed by the bevelled edges of said rings on opposite sides of the said ring, and means for adjusting said housings angularly about said supporting means to change the speed of the driven sheave said ring supports being cylindrical and coaxial with said shaft.

4. The combination of driving and driven sheaves rotatable about parallel axes, of a frame comprising a pair of housings spaced apart parallel to each other, means for supporting said housings to swing about one end thereof, a shaft journaled in said housings, a support slidably and rotatably mounted on said shaft, a second support mounted on said shaft and fixed against axial movement thereon, a set of bevel edged rings equi-distantly spaced along and fixed to the second support, a second set of bevel edged rings spaced apart along said support at distances equal to the spacing between the first named set of rings and arranged in alternation with the first named ring, all of said rings and shaft having a common axis, each of said driving and driven sheaves having circumferential V-grooves spaced apart at a distance equal to the spacing of the bevel edged ring on their respective supports, V-belts extending around said V-grooves and parallel to each other around the V-grooves formed by the bevelled edges of said rings, and means for adjusting said housings angularly about said supporting means to change the speed of said driven sheave, said ring supports being cylindrical and coaxial with said shaft.

5. The combination of driving and driven sheaves rotatable about parallel axes, of a frame comprising a pair of housings spaced apart parallel to each other, a shaft journaled in said housings, a support slidably and rotatably mounted on said shaft, a second support mounted on said shaft and fixed against axial movement thereon, a bevel edged ring fixed to the second support, a pair of bevel edged rings similar to said ring and fixed to the first named support, one on each side of said ring, all of said rings and shaft having a common axis, each of said driving and driven sheaves having a circumferential V-groove, and V-belts extending around said V-grooves and around the grooves formed by the bevelled edges of said rings on opposite sides of the said ring, a pair of standards, a rod journaled at its opposite ends in said standards parallel to said axis, said housings being provided with a pair of coaxial cylindrical apertures near one end of each, a pair of cylinders rotatable in said apertures and fixed eccentrically to said rod, and means for angularly adjusting said rod to change the position of said frame relative to the said driving and driven sheaves, said ring supports being cylindrical and coaxial with said shaft.

6. The combination of driving and driven sheaves rotatable about parallel axes, of a frame comprising a pair of housings spaced apart parallel to each other, a shaft journaled in said housings, a support slidably and rotatably mounted on said shaft, a second support mounted on said shaft and fixed against axial movement thereon, a set of bevel edged rings equi-distantly spaced along and fixed to the second support, a second set of bevel edged rings spaced apart along said support at distances equal to the spacing between the first named set of rings and arranged in alternation with the first named ring, all of said rings and shaft having a common axis, each of said driving and driven sheaves having circumferential V-groooves spaced apart at a distance equal to the spacing of the bevel edged ring on their respective supports, V-belts extending around said V-grooves and parallel to each other around the V-grooves formed by the bevelled edges of said rings, a pair of standards, a rod journaled at its opposite ends in said standards parallel to said axis, said housings being provided with a pair of coaxial cylindrical apertures near one end of each, a pair of cylinders rotatable in said apertures and fixed eccentrically to said rod, and means for angularly adjusting said rod to change the position of said frame relative to the said driving and driven sheaves, said ring supports being cylindrical and coaxial with said shaft.

7. A multiple belt change speed sheave comprising a shaft, a cylindrical support, means for fixing said support to said shaft, a pair of bevel edged rings fixed to said support, a second cylindrical support, means for slidably connecting said second support to said shaft, and a bevel edged ring interposed between said rings and fixed to the second support, said rings and supports and shaft having a common axis.

8. A multiple belt change speed sheave comprising a shaft, a cylindrical support, means for fixing said support to said shaft, a bevel-edged ring fixed to said support, a second cylindrical support, means for slidably connecting said second support to said shaft, and a pair of bevel-edged rings secured to said second support on opposite sides of the first named ring, said rings and supports and shaft having a common axis.

NELSON B. HENRY.